H. F. CRANDALL.
FISH LURE.
APPLICATION FILED MAR. 16, 1917.

1,268,097.

Patented June 4, 1918.

Inventor.
Henry F. Crandall,
by E. W. Burgess
Atty.

UNITED STATES PATENT OFFICE.

HENRY F. CRANDALL, OF RACINE, WISCONSIN.

FISH-LURE.

1,268,097.  Specification of Letters Patent.  Patented June 4, 1918.

Application filed March 16, 1917. Serial No. 155,202.

*To all whom it may concern:*

Be it known that I, HENRY F. CRANDALL, a citizen of the United States, residing at Racine, in the county of Racine and State of Wisconsin, have invented certain new and useful Improvements in Fish-Lures, of which the following is a clear and exact specification.

My invention relates to fish lures in general and in particular to those commonly called "weedless," wherein means are provided for preventing the hook from engaging with weeds as it is being drawn through the water in casting or trolling.

The object of my invention is to provide a device of the character indicated that will be simple and inexpensive in its construction and efficient in operation.

I attain this object by means of the mechanism illustrated in the accompanying drawing, in which—

Figure 1:
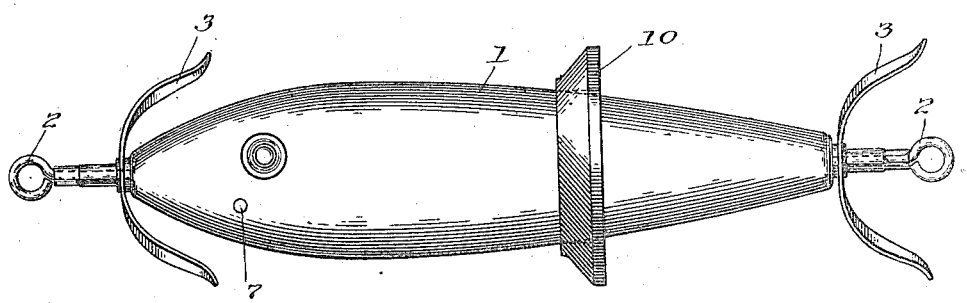
Figure 2:
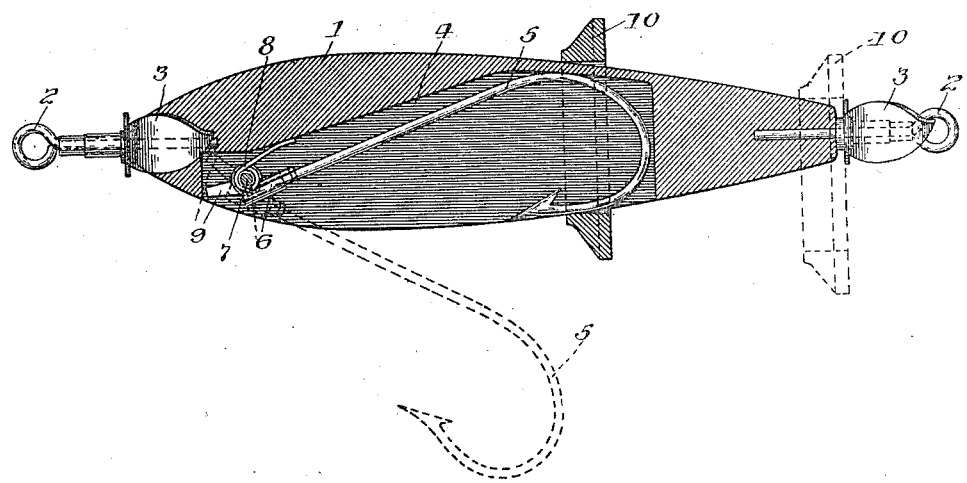

Figure 1 is a side elevation of a lure having my invention embodied in its construction; and Fig. 2 is a longitudinal sectional elevation of parts of Fig. 1.

The same reference characters designate like parts throughout the several views.

The device includes a common form of elongated body 1 tapering toward its opposite ends and provided at each end with the usual line attaching elements 2, upon which are rotatably mounted the whirls 3. The body 1 is provided with a longitudinally and diametrically disposed kerf 4 adapted to receive a hook 5 having a shank 6 secured thereto that is pivotally connected with the head of the body 1 by means of a transversely disposed pin 7, and 8 represents a coiled spring mounted upon the pin having one end thereof engaging with the bottom wall of the kerf and its opposite end with the shank 6 in a manner to normally swing the hook outward about the axis of the pin; the shank 6 having an extension 9 adapted to engage the bottom wall of the kerf in a manner to limit the degree of outward swing of the hook, as shown by dotted lines in Fig. 2. 10 represents a collar loosely mounted upon the opposite end of the body 1 and adapted to be moved longitudinally thereof in a manner to engage with and retain the hook in a concealed position within the kerf, as shown by full lines in Fig. 2.

It is apparent that when the hook is in the position indicated it cannot engage with weeds as it is being drawn through the water, and it is obvious that a slight pull upon the collar 10, as when a fish strikes the lure, will release it and permit the spring 8 to swing the hook outward to impale the fish; the whirl 3 at the bottom of the body 1 preventing the collar 10 from leaving the body, as shown by dotted lines in Fig. 2.

Having shown and described one form which my invention may assume in practice, I do not desire that it be confined to the specific details of the structure as illustrated, it being understood that changes may be made in the form, proportion, and organization of its several parts without departing from the spirit of my invention as indicated in the appended claims.

What I claim as my invention and desire to secure by Letters Patent is:

1. An article of the character described including, in combination, a body, a spring-pressed hook connected with said body, and a collar slidably mounted upon said body and adapted to releasably retain said hook in a concealed position within said body.

2. An article of the character described including, in combination, an elongated body having a longitudinally disposed kerf therein, a spring-pressed hook pivotally mounted within said kerf, and a collar slidably mounted upon said body and adapted to releasably retain said hook in a concealed position within said kerf.

3. An article of the character described including, in combination, an elongated body having a longitudinally and diametrically disposed kerf therein, a hook adapted to be received within said kerf, a shank member secured to one end of said hook, a pin carried by the side walls of said kerf and having said shank pivotally mounted thereon, a coiled spring mounted upon said pin and reactive to normally swing said hook outward, and releasable means for retaining said hook in a concealed position within said kerf.

4. An article of the class described including, in combination, an elongated body having a longitudinally and diametrically disposed kerf therein, a hook adapted to be received within said kerf, a shank member secured to one end of said hook, a pin carried by the side walls of said kerf and having said shank pivotally mounted thereon, a coiled spring encircling said pin and reactive to swing said hook outward, said shank being provided with an extension adapted to engage with the bottom wall of said kerf in a manner to limit the degree of an outward swing of said hook, and releasable means for retaining said hook in a concealed position within said kerf.

5. An article of the class described including, in combination, an elongated body having a longitudinally and diametrically disposed kerf therein, a hook adapted to be received within said kerf, a shank member secured to one end of said hook, a pin carried by the side walls of said kerf and having said shank pivotally mounted thereon, a coiled spring encircling said pin and reactive to swing said hook outward, said shank being provided with an extension adapted to engage with the bottom wall of said kerf in a manner to limit the degree of an outward swing of said hook, and a collar slidably mounted upon said body and adapted to releasably retain said hook in a concealed position within said kerf.

HENRY F. CRANDALL.

Copies of this patent may be obtained for five cents each, by addressing the "Commissioner of Patents, Washington, D. C."